Jan. 2, 1968  J. M. HASSIG ET AL  3,361,640
NUCLEAR REACTOR FUEL ASSEMBLY
Filed May 4, 1966  3 Sheets-Sheet 1

Jan. 2, 1968   J. M. HASSIG ET AL   3,361,640

NUCLEAR REACTOR FUEL ASSEMBLY

Filed May 4, 1966   3 Sheets-Sheet 3

United States Patent Office 3,361,640
Patented Jan. 2, 1968

3,361,640
NUCLEAR REACTOR FUEL ASSEMBLY
Jean Marc Hassig, Orsay, Roland Roche, Clamart, and Jacques Trelin, St. Remy-les-Chevreuse, France, assignors to Commissariat à l'Énergie Atomique, Paris, France
Filed May 4, 1966, Ser. No. 547,466
Claims priority, application France, May 19, 1965, 17,661
5 Claims. (Cl. 176—78)

ABSTRACT OF THE DISCLOSURE

A nuclear reactor fuel assembly is made up of pencils of canned fuel elements. Each fuel pencil has helical fins. The fins are notched to receive the secant fins of adjacent fuel pencils, axially interlocking the fins.

---

This invention relates to a nuclear reactor fuel assembly of the type in which the fissile material is provided in the form of canned fuel elements or so-called pencils arranged in a cluster.

In fuel clusters of this type, the fuel pencils are usually spaced by means of braces and end support grids which also serve to secure said fuel pencils axially.

However, said grids and braces result in high individual pressure drops which prove very costly without preventing such phenomena as thermal instability which are still liable to arise.

Furthermore, spacer members of this type add an appreciable quantity of neutron-absorbing material around the fissile material, which is detrimental to the neutron yield of a nuclear reactor.

The object of this invention is to dispense with the need of grids and braces by so designing a fuel assembly that the fuel elements or so-called fuel pencils are individually supported relatively to each other by means of their own fins.

The fuel assembly which is thus contemplated is accordingly characterized in that the can of each fuel pencil is provided with helical fins in which are formed uniformly spaced notches for inserting therein the secant fins of adjacent fuel pencils and for axially interlocking said fins.

In accordance with a further characteristic feature of the invention, the can is provided with at least one helical fin, the summit of which is truncated along a plane which is parallel to the axis of the fuel pencil.

In a preferred form of embodiment, the fuel assembly is fitted with a retaining collar for supporting the fuel pencils at each end of said assembly.

The positioning of the fuel pencils which form part of a fuel assembly as considered in transverse cross-section is thus ensured by applying the fins against each other, whilst axial interlocking is carried out by means of the interengagement of said fins. Since a simple external retaining collar serves to hold the fuel-pencil cluster or "bundle," the pressure drops and overall dimensions resulting from the presence of auxiliary components are accordingly reduced to a minimum.

A number of other properties and advantages of the invention will become apparent from the following detailed description of one form of embodiment which is given by way of example and illustrated in the accompanying drawings, wherein.

Figure 1:
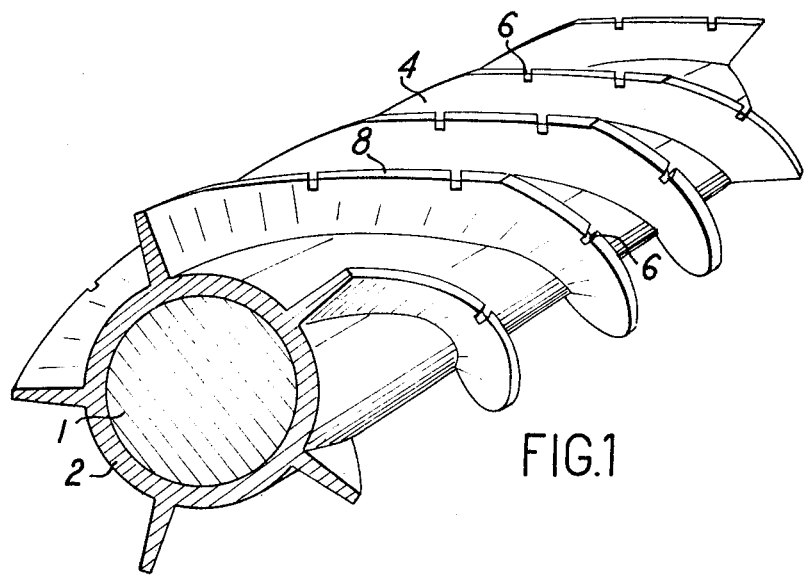
FIG. 1 is a view in perspective of a fuel element of the so-called pencil type which is shown only partially.

In the fuel assembly which forms the subject of this invention, the fissile material 1 is placed, for example in the form of pellets, inside a can 2 provided with helical fins 4 which are five in number in the form of embodiment shown in FIG. 1. For the sake of enhanced clarity of the figure, the fins have been shown as having a relatively short pitch whereas it is in fact preferable to adopt a very long pitch as in the case of the fins shown in FIG. 2 in order to facilitate the flow of coolant.

Figure 2:
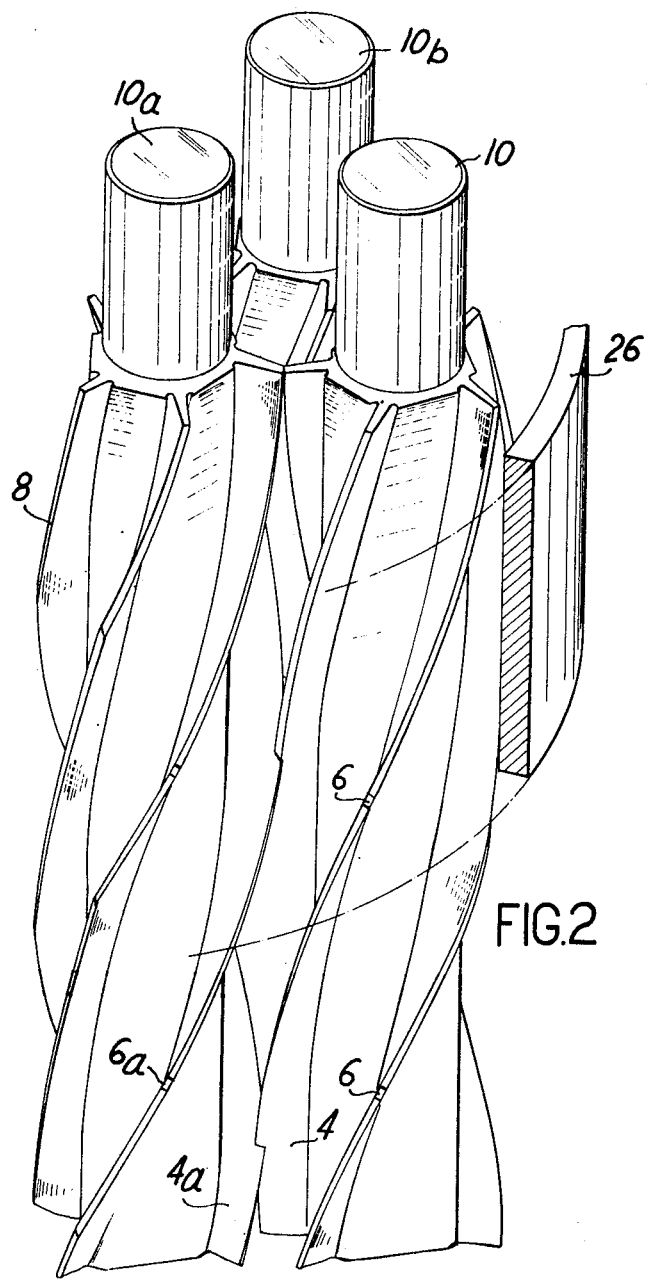
FIG. 2 shows the assembly of pencils in the fuel cluster.

Said fins 4 are provided with notches 6, the width of which corresponds to the thickness of a fin 4 and which are slightly inclined with respect to the axis of the fuel pencil so as to permit the insertion therein of the secant fin 4a of the adjacent fuel pencil (as shown in FIG. 2). Two adjacent fuel pencils 10 and 10a are therefore firmly secured to each other as a result of the interengagement of their fins 4 and 4a and are also interlocked axially. Similarly, a third fuel pencil 10b is secured in the same manner to the fuel pencils 10 and 10a by inserting the fins of said fuel pencil in the notches 6 and 6a of the fins 4 and 4a of the two other fuel pencils. Each fuel pencil of a fuel assembly is thus supported by means of its fins on the fins of adjacent fuel pencils. The depth of the notches and the width of the fins govern the spacing between the different fuel pencils according to the design characteristics of the fuel assembly.

Figure 4:
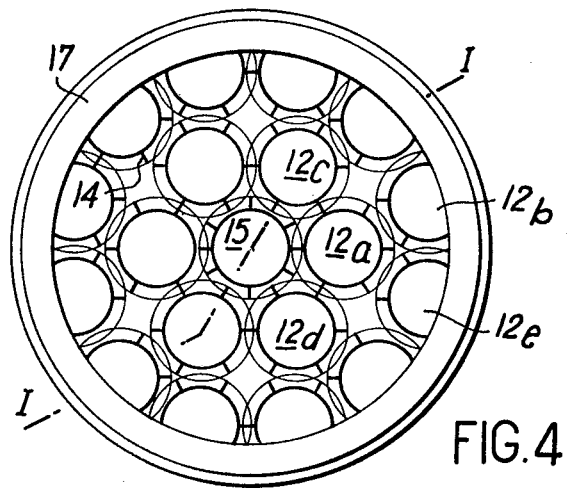
FIG. 4 is a view of the fuel assembly of FIG. 3 looking on the end.

FIG. 4 shows the arrangement of fuel pencils in a fuel assembly of this type. Nineteen fuel pencils each provided with six fins 14 are arranged in two concentric circles respectively of six and twelve fuel pencils around a central pencil 15. In the figure, a circle drawn in a thin line materializes the envelope cylinder of the fins 14 and shows that the fins of the fuel pencil 12a intersect those of the fuel pencils 12b, 12c, 12d and 12e as well as those of the central fuel pencil 15.

Figure 3:
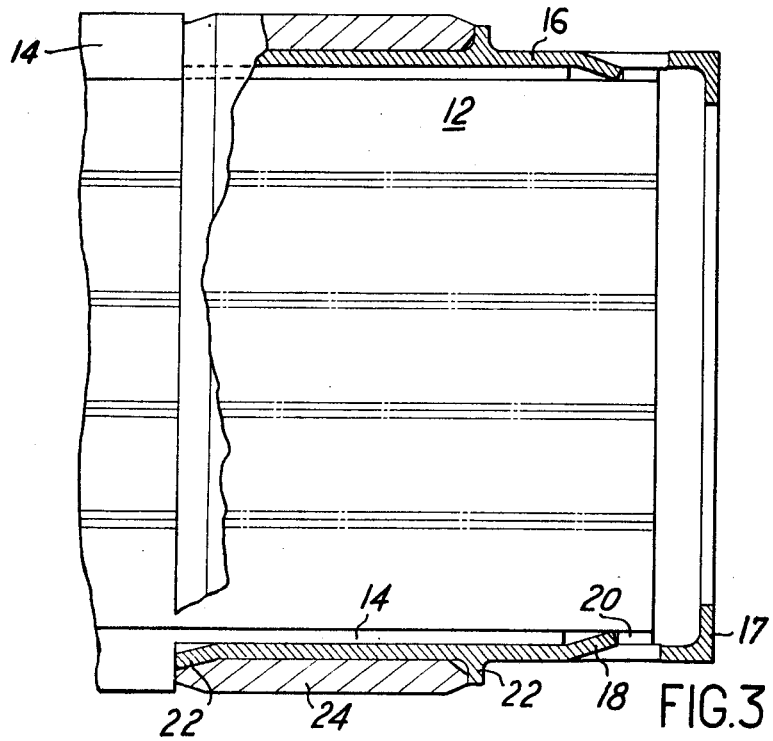
FIG. 3 is a sectional view on a larger scale along line I—I of FIG. 4 and showing the end of a fuel assembly or cluster consisting of 19 fuel pencils, the lateral portions of said assembly having been enlarged.

At each end of the fuel assembly, a retaining collar 16 holds the peripheral fuel pencils in place. In the form of embodiment of FIGS. 3 and 4, the retaining collar 16 extends beyond the fuel pencils and forms an internal flange 17. The collar is secured to the fins 14 by means of tongues 18 which are cut out in the collar wall and bent back into a groove 20 which is cut in said fins 14. Two external flanges 22 serve as supports for an annular shoe which is employed for the purpose of guiding and centering the fuel assembly in the reactor channel.

At the other end of the fuel assembly, the retaining collar 26 (as shown in FIG. 2) consists of a simple ring which is attached to the fins of the fuel pencils by any suitable means and which can also be adapted to carry an annular guide shoe.

In order to facilitate contact between the fins and the retaining collar 26 or to make it possible to bring the fuel pencils closer together, a certain number of fins 4 are truncated at 8 along a plane which is parallel to the axis of the fuel pencil and thus present a flat surface whereby each of said fins is permitted to bear against the corresponding face of the adjacent fin (as shown in FIG. 2).

Figure 5:
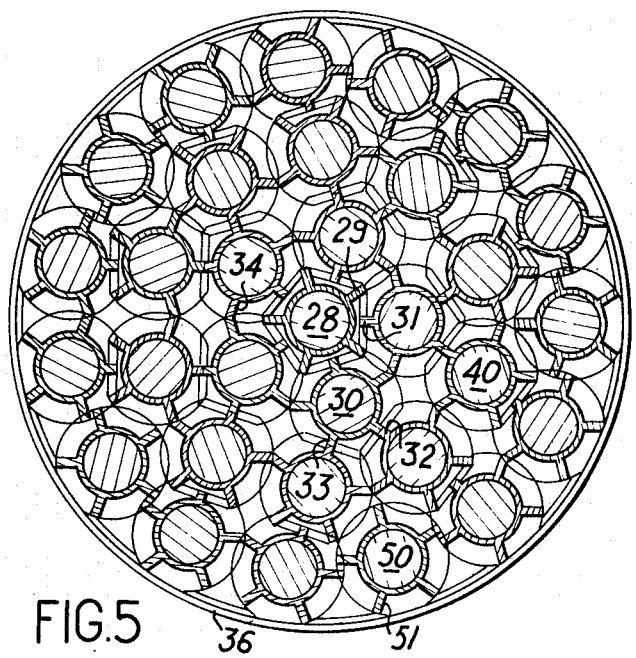
FIG. 5 is a diametral sectional view of a fuel assembly consisting of 31 pencils.

The distance between the fuel pencils can thus be reduced, and provision can accordingly be made for fuel assemblies of relatively small overall size comprising a large number of pencils of fissile material. One form of embodiment of this type is illustrated in FIG. 5 which shows the arrangements of the fuel pencils in a fuel assembly consisting of thirty-one fuel pencils each having five helical fins which are provided with notches at uniform intervals, the summits of a number of said fins being truncated parallel to the axis of the fuel pencil so as to bear against the similarly truncated fin of the adjacent fuel pencil.

These fuel pencils are spaced around a central fuel pencil 28 in three concentric circles respectively comprising 5, 10 and 15 fuel pencils, the pencils of one circle being applied against those of the adjacent circle by means of truncated fins. As can be seen from the figure, the central fuel pencil 28 is surrounded by a pentagon which is drawn in a thin line and shows that all of its fins 29 are truncated in such a manner as to bear against the fins 31 of the surrounding fuel pencils 30.

The fuel pencils 30 are provided in addition to the truncated fin 31 with at least two other truncated fins 32, 33 which bear against the fuel pencils 40 of the following circle whilst the fins 34 which are simply provided with notches interengage with the secant fins of the two adjacent fuel pencils 30 of the same circle.

Similarly, the fuel pencils 40 and the peripheral fuel pencils 50 are provided with fins which are only notched for the purpose of joining these latter to the fuel pencils of the same circle and also with fins which are both truncated and notched so as to permit said pencils to bear against the pencils of the other circles. The peripheral fins 51 of the fuel pencils are also truncated so as to permit of their attachment to the retaining collar 36 which holds the fuel assembly in position.

By varying the arrangement and extent both of the truncated portions and notches, it is possible to adjust the distance between fuel pencils so as to obtain assemblies or bundles of different configurations. The number and pitch of the fins also have an influence on this arrangement; and it will also be apparent that all the fins of a same bundle have the same pitch and the same thickness which are chosen so as to meet aerodynamic conditions and to facilitate heat transfer.

It is thus possible to construct fuel assemblies having the requisite characteristics and comprising the desired number of fuel pencils which are arranged in accordance with a predetermined geometry. A fuel assembly of this type is only of minimum overall size since the distance between fuel pencils is only that which is absolutely necessary for the flow of coolant between said pencils and since the structure which supports the fuel bundle is limited to one retaining collar at each end which additionally serves to guide said fuel bundle within the fuel channel.

A number of modifications can in any case be made in the forms of embodiment which have just been described without thereby departing from the scope of the invention. For example, the two retaining collars which serve to support the fuel bundle can be identical and consists either of a ring 26 through which the end-caps of the fuel pencils are permitted to pass, or of a ring 16 with a supporting flange 17, or of any other suitable expedient for holding the fuel pencils in position.

What we claim is:

1. A fuel assembly comprising canned pencils of fissile material grouped in a cluster, helical fins for the can of each fuel pencil and uniformly spaced notches in said fins receiving the secant helical fins of adjacent fuel pencils whereby said fins are axially interlocked.
2. A fuel assembly as described in claim 1, the summit of at least one of the helical fins being truncated along a plane parallel to the axis of the fuel pencil.
3. A fuel assembly as described in claim 1 including a retaining collar at each end of the fuel assembly holding the peripheral fuel pencils.
4. A fuel assembly as described in claim 3 including an annular guide shoe for the retaining collar.
5. A fuel assembly as described in claim 3, the retaining collar being secured by engaging a groove in the fins of the peripheral pencils of said fuel assembly.

References Cited
UNITED STATES PATENTS

| 3,308,034 | 3/1967 | Schmidt | 176—81 X |
| 3,030,293 | 4/1962 | Wyatt | 176—81 |
| 3,049,485 | 8/1962 | Tatlock et al. | 176—81 X |
| 3,137,637 | 6/1964 | Elliott | 176—81 X |
| 3,150,057 | 9/1964 | Monson et al. | 176—81 X |

FOREIGN PATENTS 567,946  6/1958  Belgium.

CARL D. QUARFORTH, Primary Examiner.

BENJAMIN R. PADGETT, Examiner.

M. J. SCOLNICK, Assistant Examiner.